Jan. 25, 1944.   W. R. GRUNEWALD   2,340,054
DRILL PRESS
Filed March 4, 1942   4 Sheets-Sheet 2

Inventor
WALTER R. GRUNEWALD,
By Clarence A. O'Brien
and Harvey B. Jacobson
Attorneys

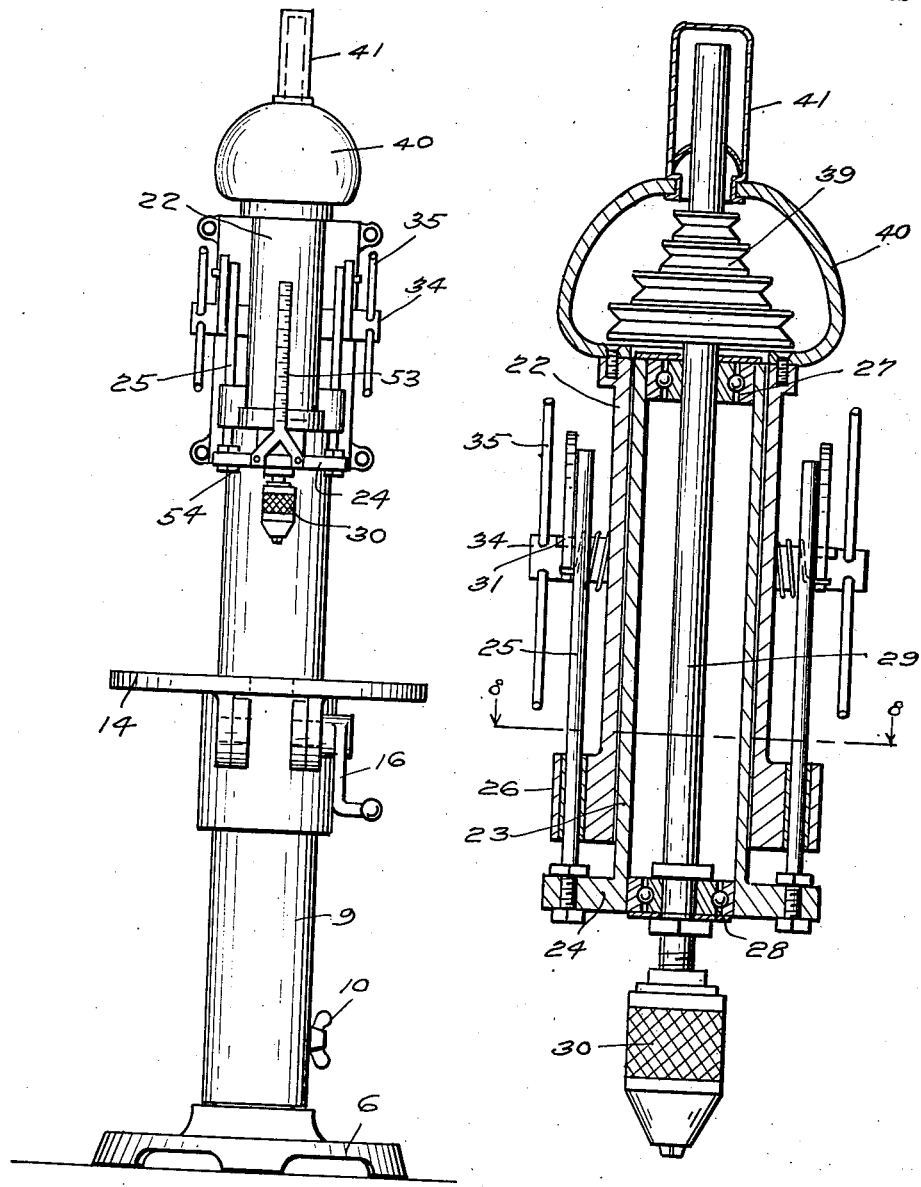

Jan. 25, 1944.   W. R. GRUNEWALD   2,340,054
DRILL PRESS
Filed March 4, 1942   4 Sheets-Sheet 4

Inventor
WALTER R. GRUNEWALD,
By Clarence A. O'Brien
and Harvey B. Jacobson
Attorneys Patented Jan. 25, 1944

2,340,054

UNITED STATES PATENT OFFICE 2,340,054

DRILL PRESS

Walter R. Grunewald, East Troy, Wis.

Application March 4, 1942, Serial No. 433,385

3 Claims. (Cl. 77—32)

The present invention relates to new and useful improvements in power-operated tools and more particularly to a drill press embodying a motor-driven spindle in which the spindle is slidably mounted in a belt-driven pulley to permit vertical movement of the chuck in which the drill bit is mounted for engaging the work and embodying automatic means for raising the spindle and chuck after the completion of the drilling operation.

A further important object of the present invention is to provide a pivotal mounting for the electric motor employed for driving the spindle and in which the motor may be supported in a vertical position, or moved into a horizontal position for operating other machinery.

A still further object is to provide a rotating clamp support for the motor and spindle mounting for rotatably securing the device on a supporting standard.

A still further object is to provide an apparatus of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 4 is a front elevational view.

Figure 5 is a vertical sectional view through the telescoping spindle housing.

Figure 1:
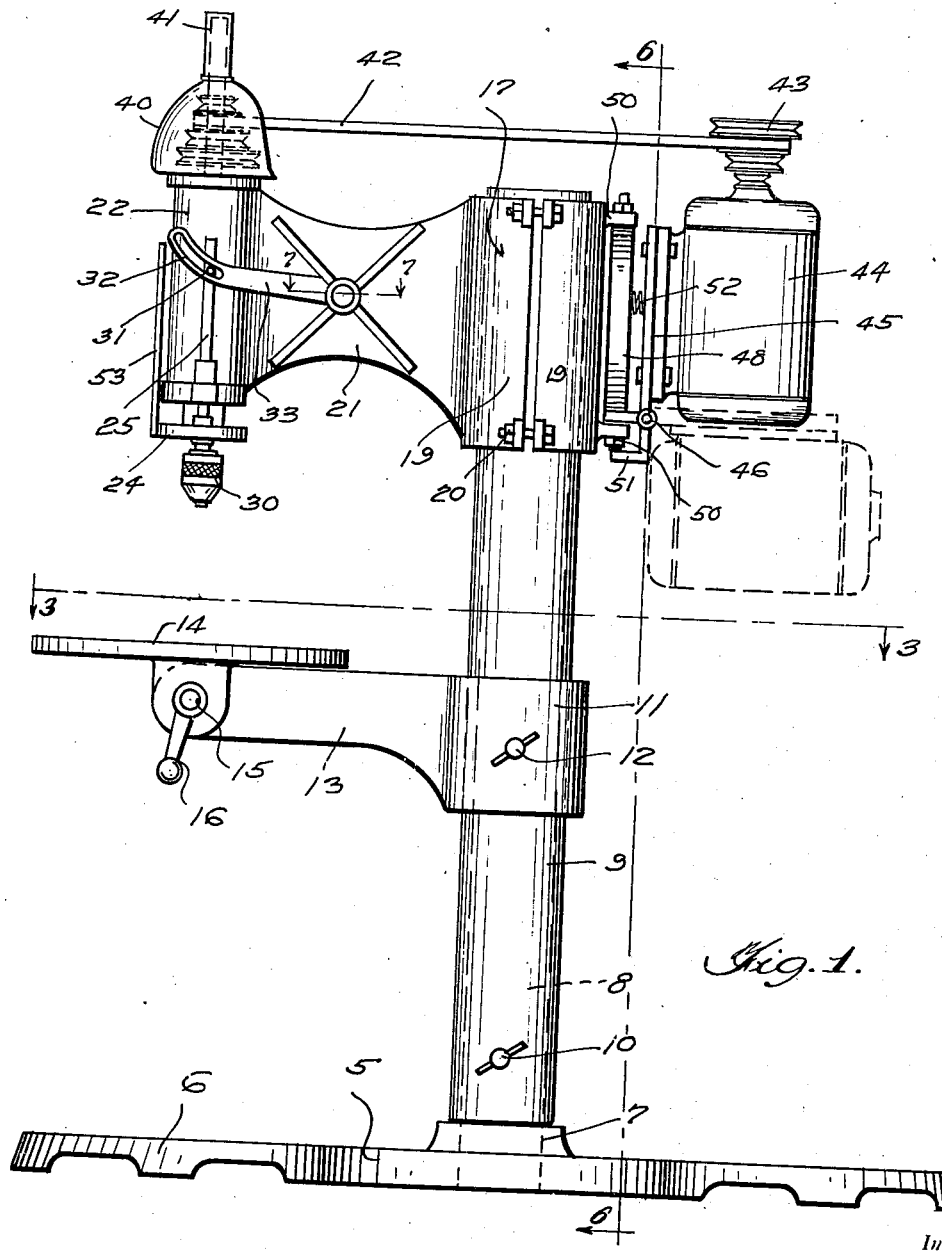
Figure 1 is a side elevational view.
Figure 2:
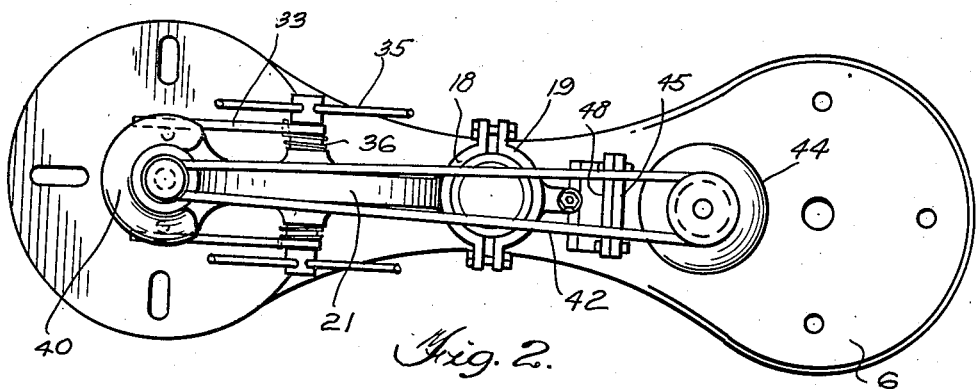
Figure 2 is a top plan view.
Figure 3:
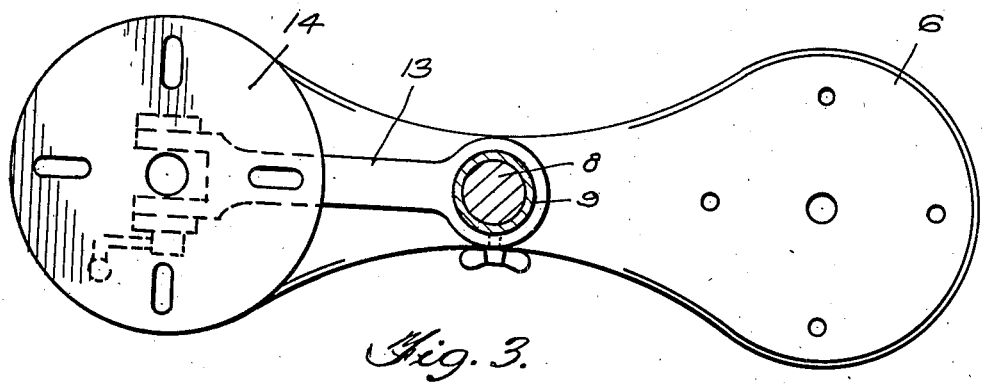
Figure 3 is a transverse sectional view taken substantially on a line 3—3 of Figure 1.
Figure 6:
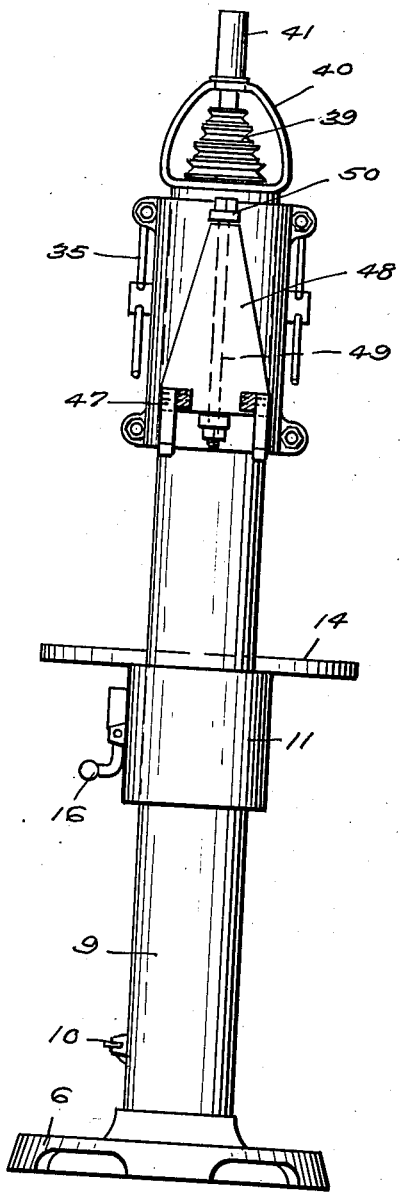
Figure 6 is a sectional view through the pivotal mounting for the motor taken substantially on a line 6—6 of Figure 1.
Figure 7:
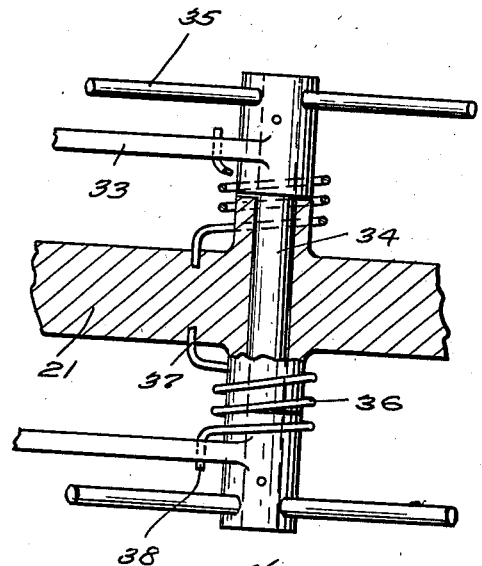
Figure 7 is a detail of the wheels and shaft for lowering the spindle.
Figure 8:
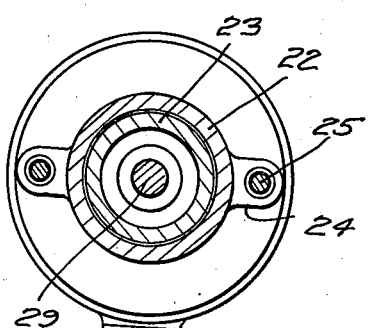
Figure 8 is a sectional view through the spindle housing taken substantially on a line 8—8 of Figure 5.

Referring now to the drawings in detail, wherein for the purpose of illustration I have disclosed a preferred embodiment of the invention, the numeral 5 designates a base having flat heads 6 extending from diametrically opposite sides of a central bearing 7 in which the lower end of a post 8 is secured. Slidably mounted on the post 8 is a tubular standard 9 secured in vertically adjusted position on the post by a set screw 10.

Slidably mounted on the standard 9 is a collar 11 secured in vertically adjusted position by means of a set screw 12, the collar having a horizontal arm 13 extending radially therefrom on the outer end of which is supported the work table 14 by means of a transverse pin 15, the table being secured in angularly adjusted position by means of a handle 16.

A clamping member 17 formed of semi-cylindrical members 18 and 19 are secured in position on the upper end of the standard 9 by means of bolts 20, the section 18 having an arm 21 extending radially therefrom on the outer end of which is formed a vertically extending tubular housing 22.

Mounted for telescoping movement in the lower end of the housing 22 is a cylindrical spindle mounting 23 having a flange 24 at its lower end in which are secured upstanding guide rods 25 slidably mounted in bearings 26 secured to the outer surface of the housing 22.

Upper and lower ball bearing assemblies 27 and 28 are secured in the tubular housing 23 for rotatably supporting the spindle 29 which projects below the flange 24 and is provided at its lower end with the chuck 30 of conventional construction.

A pin 31 projects laterally from each of the rods 25, the pins being slidably positioned in an arcuate slot 32 formed adjacent one end of an arm 33 which projects radially from a shaft 34 journaled in the spindle housing supporting arm 21.

The shaft 34 projects through opposite sides of the arm 21 and one of the arms 33 is secured adjacent each end of the shaft. Each end of the shaft is also provided with manipulating spokes 35 for rotating the shaft whereby the spindle 29 and chuck 30 may be lowered by means of the connection of the rod 25 with the arm 33 through the pin and slot connection 31 and 32.

The spindle and chuck are returned to their upper position by means of coil springs 36 positioned on opposite ends of the shaft 34, one end of each spring being inserted in a recess in an adjacent side of the arm 21 as shown at 37, while the opposite end of the spring, indicated at 38, is projected under the adjacent arm 33.

On the upper end of the spindle 29 is secured a stepped pulley 39, the pulley being suitably keyed to the spindle and slidably mounted thereon. The pulley is enclosed in a dome-shaped housing 40 secured to the upper end of the housing 22 and the upper end of the spindle projects upwardly through the shield 40 into a tubular cap 41 secured on top of the dome-shaped shield 40. The upper end of the spindle 29 is adapted to project upwardly into the cap 41 when the spindle is in its raised position.

The spindle 39 is driven by a belt 42 from a stepped pulley 43 mounted on one end of an electric motor 44 which is supported in a vertical position by an attaching plate 45 provided with spaced pins 46 adjacent its lower edge for pivotally mounting in brackets 47 secured at the lower edge of a substantially triangular-shaped plate 48 having a pin 49 extending vertically therethrough with its upper and lower ends secured in outwardly projecting lugs 50 carried by the section 19 of the clamping member 17. A stop 51 extends downwardly below the brackets 47 for engaging one end of the motor 44 when the same is swung into its lowermost position, as shown by the dotted lines in Figure 1 of the drawings, so that the motor may be utilized for driving other machinery, if desired.

A coil spring 52 is interposed between the plate 45 and the plate 48 to urge the motor 44 outwardly and maintain proper tension on the belt 42.

One end of a vertically disposed ruler 53 is secured to the flange 24 for cooperating with an indicator or mark 54 carried on the lower edge of the housing 22 to indicate the distance at which the chuck 30 is lowered.

From the foregoing it will be apparent that the standard 9 may be adjusted vertically to the desired position on the post 8 and also the work-supporting table 14 may be adjusted on the standard 9.

When the motor 44 is running the spindle 29 and chuck 30 will be continuously operated and the chuck and spindle may be lowered through the manipulation of the spokes 35 causing the arm 33 to be moved downwardly and thereby move the rod 25 downwardly through the pin and slot connection 31 and 32. After the drilling operation has been completed, the spokes 35 are released and the springs 36 will then return the chuck and spindle to its uppermost position.

It is believed the details of construction, manner of operation and advantages of the device will be readily understood from the foregoing without further detailed explanation.

Having thus described the invention what I claim is:

1. A drill press comprising a base composed of a pair of substantially flat plate members, a web connecting the plate members, a post rising from the web, a standard mounted for rotatable and slidable adjustment on the post, a work-supporting table adjustably mounted on the standard, a longitudinally split cylindrical clamping member secured on the standard above the table, an arm extending horizontally from one side of the clamping member, a spindle having a chuck at one end and mounted for vertical adjustment in the outer end of the arm, a motor carried by the clamping member at an opposite side of the standard, and a drive connection between the motor and spindle.

2. A drill press comprising a cylindrical housing, means for supporting the housing in a vertical position, a cylindrical spindle support mounted for telescoping movement in the housing, a spindle journaled in the support and having a chuck at its lower end, a shaft journaled in the housing and having a manipulating member, a vertical rod carried by the spindle support, an arm projecting radially from the shaft, and a pin and slot connection between the rod and the arm for actuating the spindle support by the member.

3. A drill press comprising a cylindrical housing, means for supporting the housing in a vertical position, a cylindrical spindle support mounted for telescoping movement in the housing, a spindle journaled in the support and having a chuck at its lower end, a shaft journaled in the housing and having a manipulating member, a vertical rod carried by the spindle support, an arm projecting radially from the shaft, and a pin and slot connection between the rod and the arm for actuating the spindle support by the member, and spring means urging the spindle support upwardly.

WALTER R. GRUNEWALD.